UNITED STATES PATENT OFFICE.

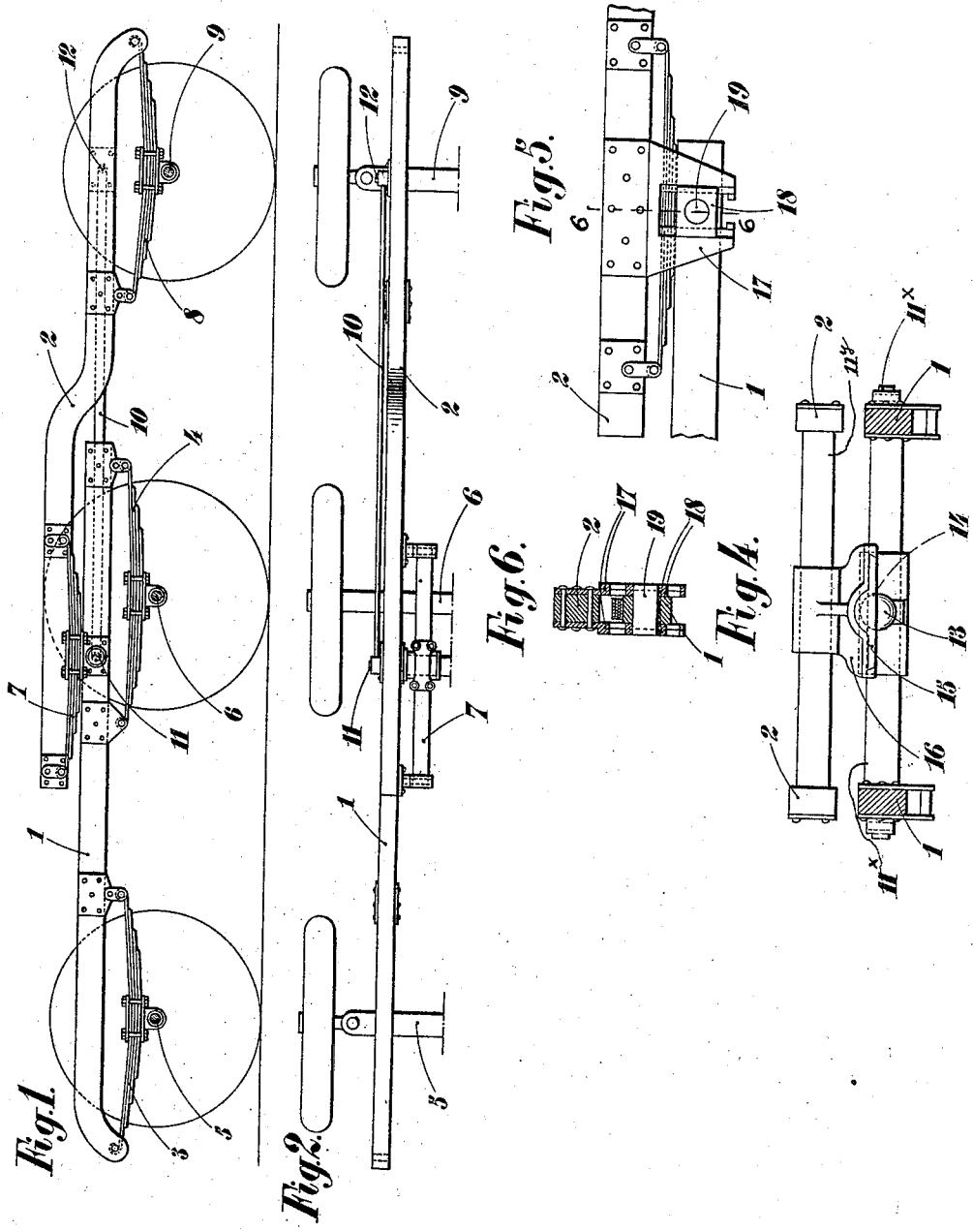

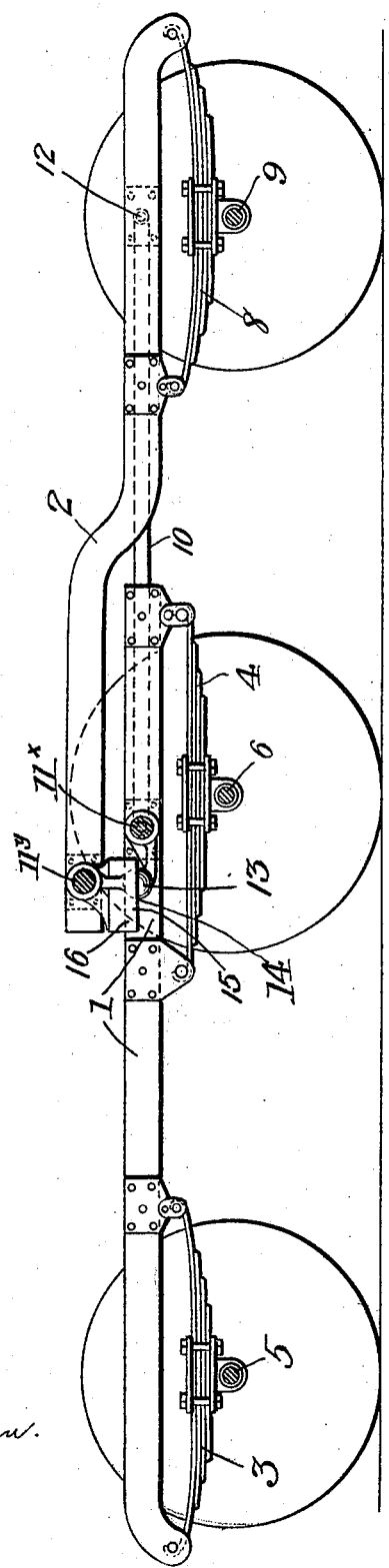

ALBERT DE DION AND GEORGES BOUTON, OF PUTEAUX, FRANCE.

RUNNING-GEAR FOR VEHICLES.

991,051.  Specification of Letters Patent.  Patented May 2, 1911.

Application filed November 3, 1908. Serial No. 460,883.

*To all whom it may concern:*

Be it known that we, ALBERT DE DION and GEORGES BOUTON, citizens of the French Republic, residing at Puteaux, Department of the Seine, in France, have invented certain new and useful Improvements in Running-Gear for Vehicles; and we do hereby declare the following to be a full, clear, and exact description of the invention, such as will enable others skilled in the art to which it appertains to make and use the same.

This invention relates to vehicles and has for its object to provide a vehicle having two chassis carried by three axles, the front and rear axles being steering axles and the median axle a driving axle. Owing to the method of connection and jointing that is employed, the chassis are capable of relative vertical movement, and the two steering axles upon each of which one of the two chassis rest remain constantly parallel.

In the accompanying drawing which illustrates the invention, Figure 1 represents a side elevation of the device for connecting and suspending the two chassis. Fig. 2 is a semi-plan corresponding to Fig. 1. Fig. 3 is a side elevation, partly in section, of a second or modified form of the running gear. Fig. 4 is an end elevation corresponding to Fig. 3. Fig. 5 is an elevation of a third device for connecting and suspending the two chassis. Fig. 6 is a vertical section taken on line 6—6 of Fig. 5.

The device represented in Fig. 1 comprises two independent chassis 1 and 2. The chassis or frames 1 rests by means of springs 3, or any other suitable resilient connection, upon one of the steering axles 5, and by the intermediary of springs 4 upon the driving axle 6. The second chassis 2, which is raised at that portion which overlaps the first chassis, rests by means of springs 7 or any other suitable resilient member, upon a cross rod 11 of the chassis 1 and by means of springs 8 upon the second steering axle 9. In order to keep the two steering axles parallel, connecting rods 10 fixed to the ends of the cross rod 11 of the chassis 1 and at 12 to the side members of the chassis 2 prevent any transverse displacement of one chassis relatively to the other and also permit of driving one chassis by the other. Each of the frames 1, 2 extends to one end of the vehicle and is of less length than the main vehicle frame which said frames form in conjunction. The frame 2 rests on the cross-rod 11 at a point above and adjacent the intermediate axle 6, as shown.

Figs. 3 and 4 illustrate a modification of the above described method of connection and suspension. The manner of suspending the chassis upon the steering axles is not altered but the spring suspension 7 above the driving axle is dispensed with, the connecting means at this point consisting of a cardan or ball and socket joint. The arrangement illustrated comprises a ball 13 solid with the chassis 1 and engaging in a corresponding cavity 14 formed in a shoe 15 the upper part of which comes into contact with the lower part of a second shoe 16 fixed to the chassis 2. The ball and the upper sliding shoe 16 are connected with the longitudinal members of the chassis by means of cross rods $11^x$ $11^y$. It is apparent that this arrangement permits of relative longitudinal movements of the two chassis, these movements being produced when the three axles 5, 6 and 9 are not in the same horizontal plane or when the springs present unequal flexures owing to an irregularly distributed load. The connecting rods 10 are fixed to the same points as in the preceding case and they serve precisely the same purpose.

Figs. 5 and 6 represent another connecting and suspension device in which the connecting rods 10, which in the preceding cases keep the steering axles parallel, are dispensed with and replaced by slideways which serve the same purpose. Two plates 17 forming slideways are fixed to one of the chassis, the chassis 2 for example, and between them there slide two parts 18 movable around a bolt 19 solid with the other chassis 1. These slideways oppose any separation of the guided parts, and keep the steering axles and the driving axle 19 at an invariable distance apart, thereby maintaining constant parallelism between the axles.

We claim:

1. In running gear for vehicles, the combination of two end axles, an intermediate axle, frames connecting the end axles with the intermediate axle and loosely connected together at the intermediate portion of the vehicle, and means for maintaining said end axles constantly in parallelism.

2. In running gear for vehicles, the combination of two end steering axles, an intermediate axle, frames comprising side bars connecting the steering axles with the intermediate axle and loosely connected together at the intermediate portion of the vehicle, and means in connection with said frames for holding the steering axles constantly parallel.

3. In running gear for vehicles, the combination of two axles, one at each end of the vehicle, an intermediate driving axle, frames comprising side members or bars connecting the end axles with the intermediate axle, said frames being loosely connected together at the intermediate portion of the vehicle, and rods connecting the frames at the sides of the vehicle and extending alongside the side bars of the frames.

4. In running gear for vehicles, the combination of two wheeled frames having springs, and a sliding connection between the frames at the inner ends, and independent of the springs, which permits independent lateral rocking movements of the frames in vertical planes and also permits relative longitudinal movements of the frames.

5. In running gear for vehicles, the combination of two wheeled frames, a ball and socket connection between the frames, and means to mount said connection in longitudinal sliding relation with one of the frames.

In testimony whereof we affix our signatures, in presence of two witnesses.

ALBERT DE DION.
GEORGES BOUTON.

Witnesses
GEORGES BOUJU,
H. C. COXE.

---

Copies of this patent may be obtained for five cents each, by addressing the "Commissioner of Patents, Washington, D. C."